United States Patent
Lovegren et al.

(10) Patent No.: US 10,305,403 B2
(45) Date of Patent: May 28, 2019

(54) DYNAMIC MOTOR DRIVE FOR BATTERY OPERATED DEVICES

(71) Applicant: Rosemount Inc., Shakopee, MN (US)

(72) Inventors: Eric Russell Lovegren, Monticello, MN (US); Richard Louis Nelson, Chanhassen, MN (US)

(73) Assignee: Rosemount Inc., Shakopee, MN (US)

( * ) Notice: Subject to any disclaimer, the term of this patent is extended or adjusted under 35 U.S.C. 154(b) by 289 days.

(21) Appl. No.: 15/198,054

(22) Filed: Jun. 30, 2016

(65) Prior Publication Data

US 2017/0237371 A1 Aug. 17, 2017

Related U.S. Application Data

(60) Provisional application No. 62/295,699, filed on Feb. 16, 2016.

(51) Int. Cl.
*G01L 19/16* (2006.01)
*H02P 8/16* (2006.01)
*H02K 37/00* (2006.01)

(52) U.S. Cl.
CPC ............... *H02P 8/16* (2013.01); *G01L 19/16* (2013.01); *H02K 37/00* (2013.01)

(58) Field of Classification Search
None
See application file for complete search history.

(56) References Cited

U.S. PATENT DOCUMENTS

| | | | |
|---|---|---|---|
| 2008/0179119 A1* | 7/2008 | Grenn | B60W 10/08 477/5 |
| 2009/0146610 A1* | 6/2009 | Trigiani | H02J 7/0018 320/119 |
| 2013/0006457 A1* | 1/2013 | Anders | E02F 9/2075 701/22 |
| 2014/0365792 A1* | 12/2014 | Yun | G06F 1/3212 713/320 |
| 2015/0226805 A1* | 8/2015 | Albers | G01S 19/31 702/182 |
| 2018/0093655 A1* | 4/2018 | Healy | B60W 20/12 |

OTHER PUBLICATIONS

"Rosemount Wireless Pressure Gauge" Emerson Process Management, dated 2016, pp. 2.
International Search Report and Written Opinion for International Patent Application No. PCT/US2017/017594, dated May 17, 2017, 12 pages.

* cited by examiner

*Primary Examiner* — Andre J Allen
(74) *Attorney, Agent, or Firm* — Christopher R. Christenson; Kelly, Holt & Christenson PLLC

(57) ABSTRACT

A battery powered device includes a battery and a motor controller that is coupled to the battery. A motor is operably coupled to the motor controller. The motor controller is configured to detect an amount of available power from the battery and engage the motor based on the amount of available power.

13 Claims, 8 Drawing Sheets

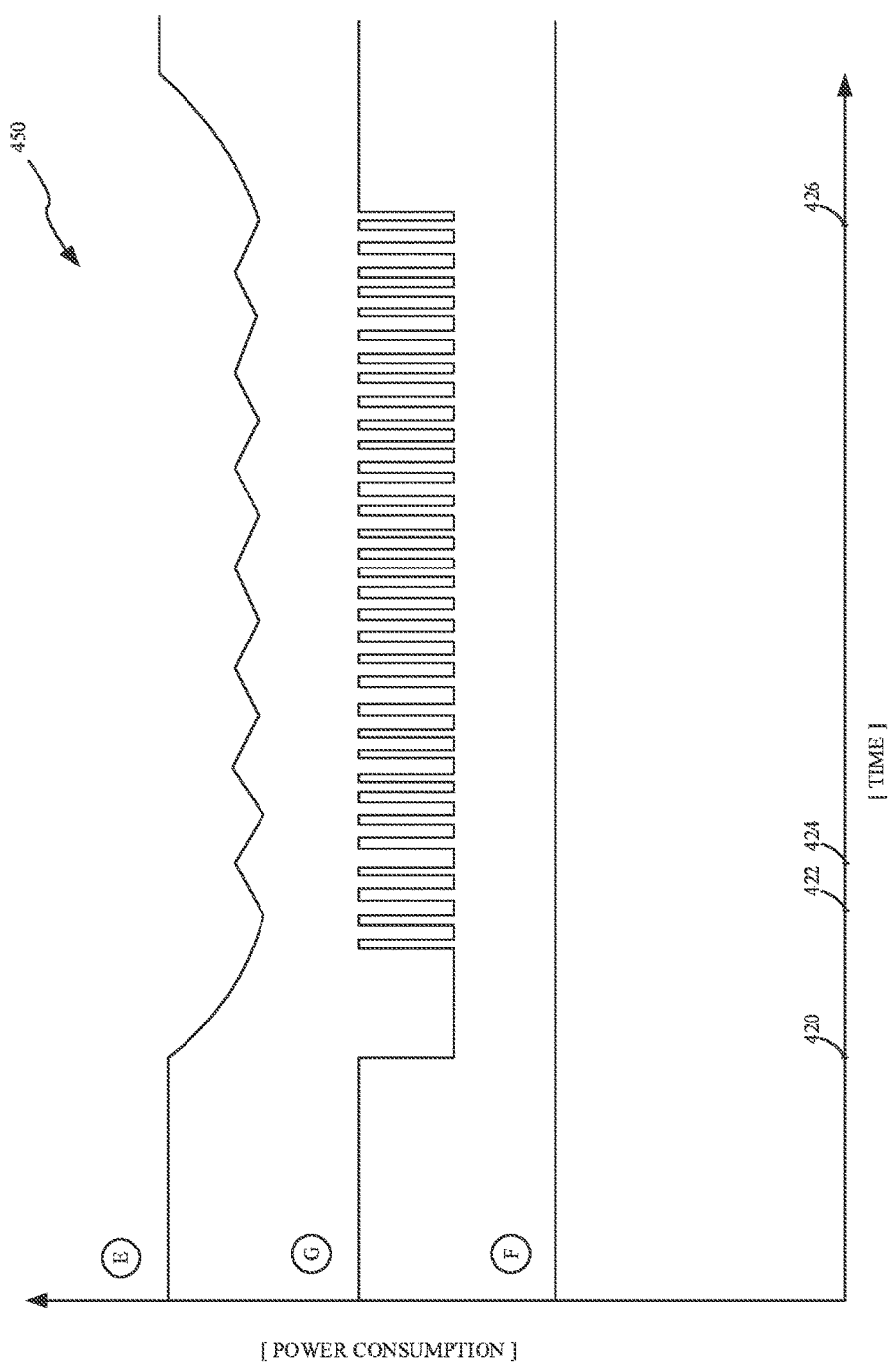

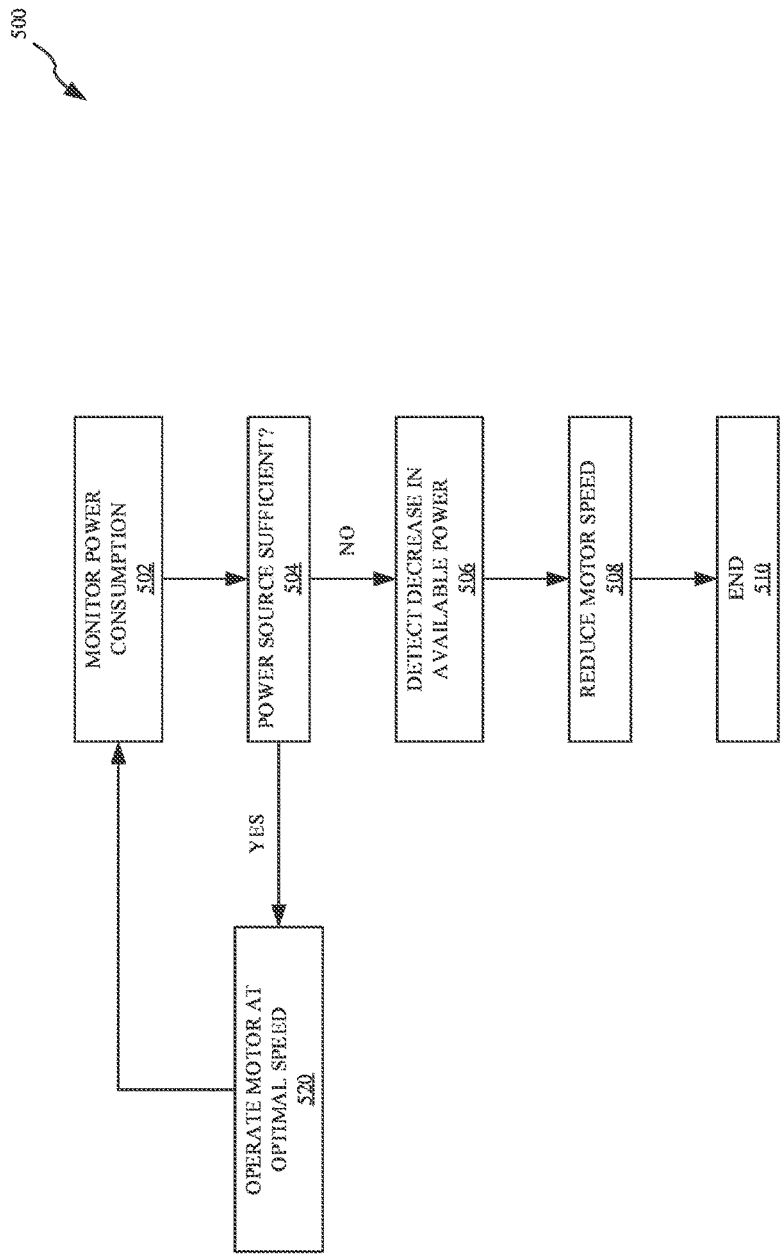

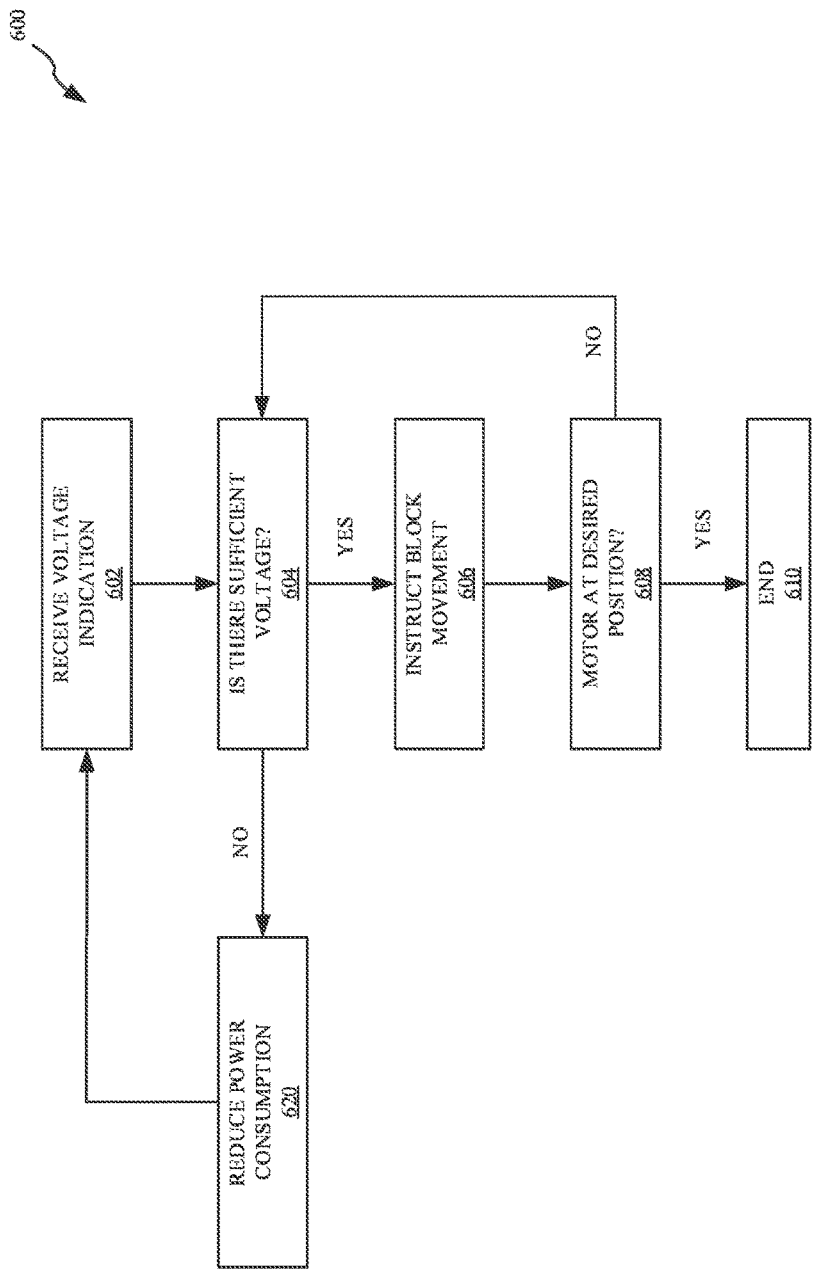

DYNAMIC MOTOR DRIVE FOR BATTERY OPERATED DEVICES

The present application claims priority of U.S. Provisional Patent Application Ser. No. 62/295,699 filed Feb. 16, 2016.

BACKGROUND

The present disclosure generally relates to battery operated devices. More specifically, but not by limitation, the present disclosure relates to systems and methods that dynamically adjust power consumption for devices with battery operated motors.

There are a wide variety of battery operated devices containing a motor. These devices can include, for example, process measurement devices, industrial machining tools, printers, appliances, and even power tools. Commonly, these devices use a standard motor drive circuit. Standard motor drive circuits require a fixed level of power in order to rotate the motor. As such, the amount of power that the motor consumes is fixed for a given rotational speed. Also, there is a limited amount of power that the device can supply to the motor. One such device is sold under the trade designation Wireless Pressure Gauge (WPG) available from Rosemount Inc. of Chanhassen, Minn. The WPG uses a standard motor drive to rotate the dial on a faceplate, and has a battery for its power supply.

The battery for such a device will eventually reach a point at which it can no longer deliver power to continuously turn the motor. When this occurs, the voltage level will drop and the device may run the risk of resetting.

SUMMARY

A battery powered device includes a battery and a motor controller that is coupled to the battery. A motor is operably coupled to the motor controller. The motor controller is configured to detect an amount of available power from the battery and engage the motor based on the amount of available power.

BRIEF DESCRIPTION OF THE DRAWINGS

FIG. 4B is a diagrammatic view of a device operating on low battery power with a dynamic motor drive.

FIG. 5 is a diagrammatic view of a method of dynamically controlling a battery powered motor.

FIG. 6 is a diagrammatic view of a method of dynamically controlling a battery power motor based on voltage indications.

DETAILED DESCRIPTION OF ILLUSTRATIVE EMBODIMENTS

Figure 1:
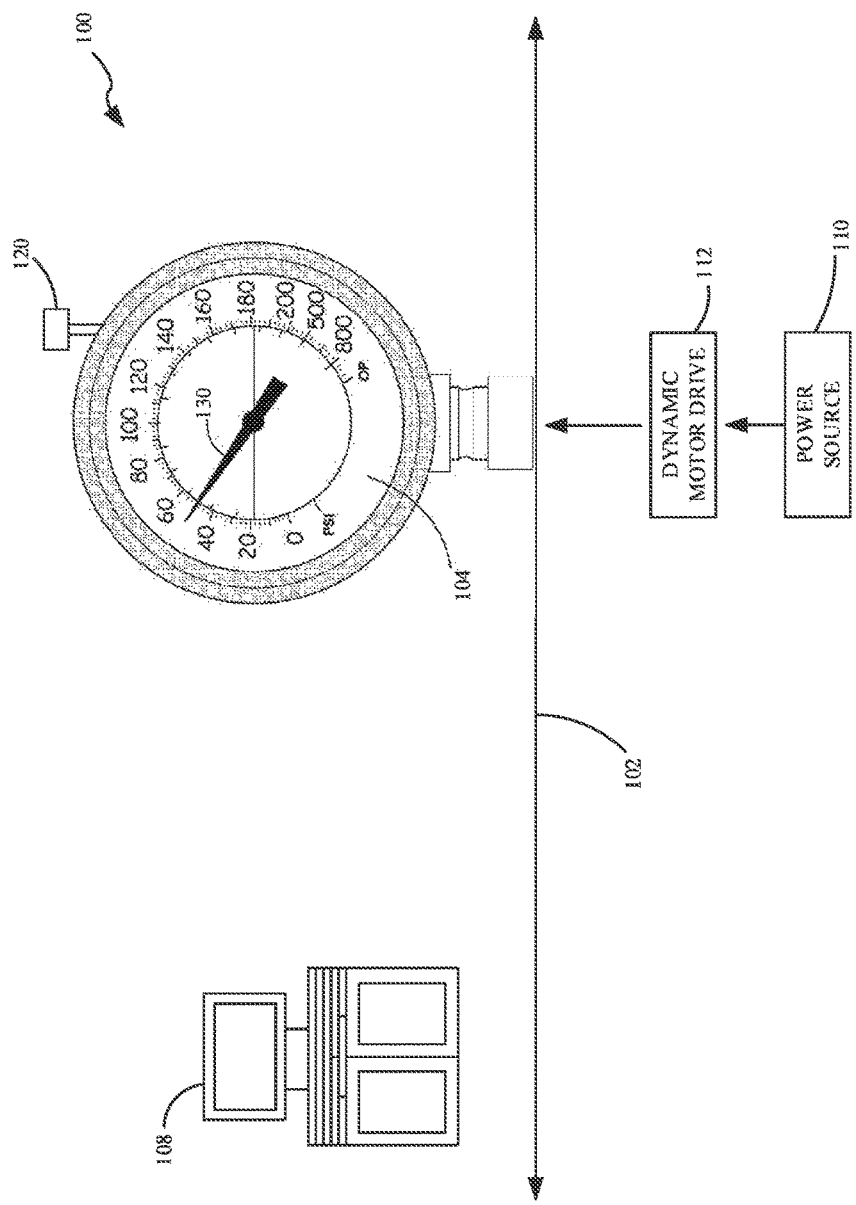
FIG. 1 is a diagrammatic view of a process control system including a dynamic motor drive in accordance with one embodiment of the present invention.

While embodiments described herein will generally be described in the context of a WPG, it is expressly contemplated that embodiments are practical for any energy constrained motor application or device. A typical design will make sure that the power consumption of the motor does not exceed the maximum available power that the battery can supply when the battery is in a good or nominal condition. In this condition, the battery will maintain its voltage and provide the required current for the motor load. However, as a battery becomes depleted and/or the ambient temperature drops, these types of systems can run into a variety of issues.

For one, as the battery ages, the internal resistance will increase such that a large current draw will result in a drop in voltage at the battery. As voltage drop increases, it reaches a point at which the system can no longer run and the device will reset if it employs a microprocessor or similar circuitry that requires a minimum voltage. Often, the startup current is high for a motor and a device with this architecture may never recover until the battery is replaced. For a WPG, resetting of the device results in dropping off the wireless network and a loss in sensor data. For instance, the WPG communicates process measurement information, obtained at the measurement device, to other systems within or outside of the process environment. In one embodiment, the WPG generates a wireless communication signal that includes an indication of a determined fluid pressure for the process. When the battery voltage decreases and causes a device reset, communication of that fluid pressure information will cease. For these and other process measurement devices, a loss in process data can be potentially harmful to process monitoring operations.

Along with an aging battery, cold temperatures can have a similar effect on power supply. In both cases the resulting reset is not a desired behavior and may occur well before the battery is totally depleted. Therefore, the realized life expectancy is lowered since there is still remaining charge left in the battery when it dies. There is also an unpredictable amount of remaining charge when the life expectancy is lowered due to a decrease in the available battery voltage.

To solve these problems, embodiments of the present invention maximize or otherwise improve battery runtime and reduce the risk of the device resetting. In lieu of running a continuous fixed motor speed, the device controls the speed of the motor based on the available power to the device. When the device has a sufficient power source, the motor runs at its optimal speed for the application. However, as the power to the device is reduced, the device will sense a drop in available power and reduce the motor speed to compensate.

In one embodiment, a dynamic motor drive is configured to maximize or otherwise improve battery runtime and reduce the chance of the device resetting. The dynamic motor drive monitors the battery power capacity and detects when the supplied power is reduced. When the dynamic motor drive detects that the power is reduced, it dynamically adjusts power consumption levels to match the power that is currently available. These and additional embodiments will be discussed in further detail below.

FIG. 1 is a diagrammatic view of a process control system including a dynamic motor drive in accordance with one embodiment of the present invention. FIG. 1 illustrates a process environment 100 for measurement device 104. Measurement device 104 is coupled to process 102. Process 102 can include piping, analytical instruments, and other devices that functionally support the flow of material through the process environment.

Measurement device 104 is configured to provide a measurement output, such as process fluid pressure, relative to the process fluid. In one embodiment, measurement device 104 is a WPG. Measurement device 104 may also include visual indicator 130. In one embodiment, visual indicator 130 is a needle positioned on a faceplate of a dial such that the needle points to a measured process variable. As such, visual indicator 130 may be operably coupled to a motor (not shown) to move the visual indicator to provide an output of the measured process variable. Measurement device 104 further includes communications component 120 that facilitates communication of the process variable. Communications component 120 may be, for example, a wireless transceiver configured to transmit and receive signals in process environment 100. In one example, communications component 120 is configured to communicate in accordance with IEC 62591.

System controller 108 may be configured to receive the communications provided by communications component 120. In one embodiment, system controller 108 also displays process variable and control signal information for a human operator. The control signal may control the process, for example.

As shown in FIG. 1, process environment 100 further includes dynamic motor drive 112. Dynamic motor drive 112 may include a variety of components and is configured to dynamically control the speed of a motor (not shown) that is powered by power source 110. For example, power source 110 provides a voltage to a motor within or coupled to measurement device 104. The motor moves measurement indicator 130 such that the indicator rotates on the faceplate to point to a measured process variable. In one embodiment, dynamic motor drive 112 monitors power source 110 to reduce the risk of measurement device 104 resetting. As similarly mentioned above, resetting measurement device 104 can result in the loss of measurement data that would have otherwise been transmitted by communications component 120. The loss of measurement data can be harmful to monitoring and maintenance operations for some process environments. Further, some process environments require strict safety measures due to the increased risk of explosion and exposure to harmful chemicals. As such, the ability to constantly and consistently monitor process 102 while reducing the risk of a measurement device resetting is advantageous.

Figure 2:
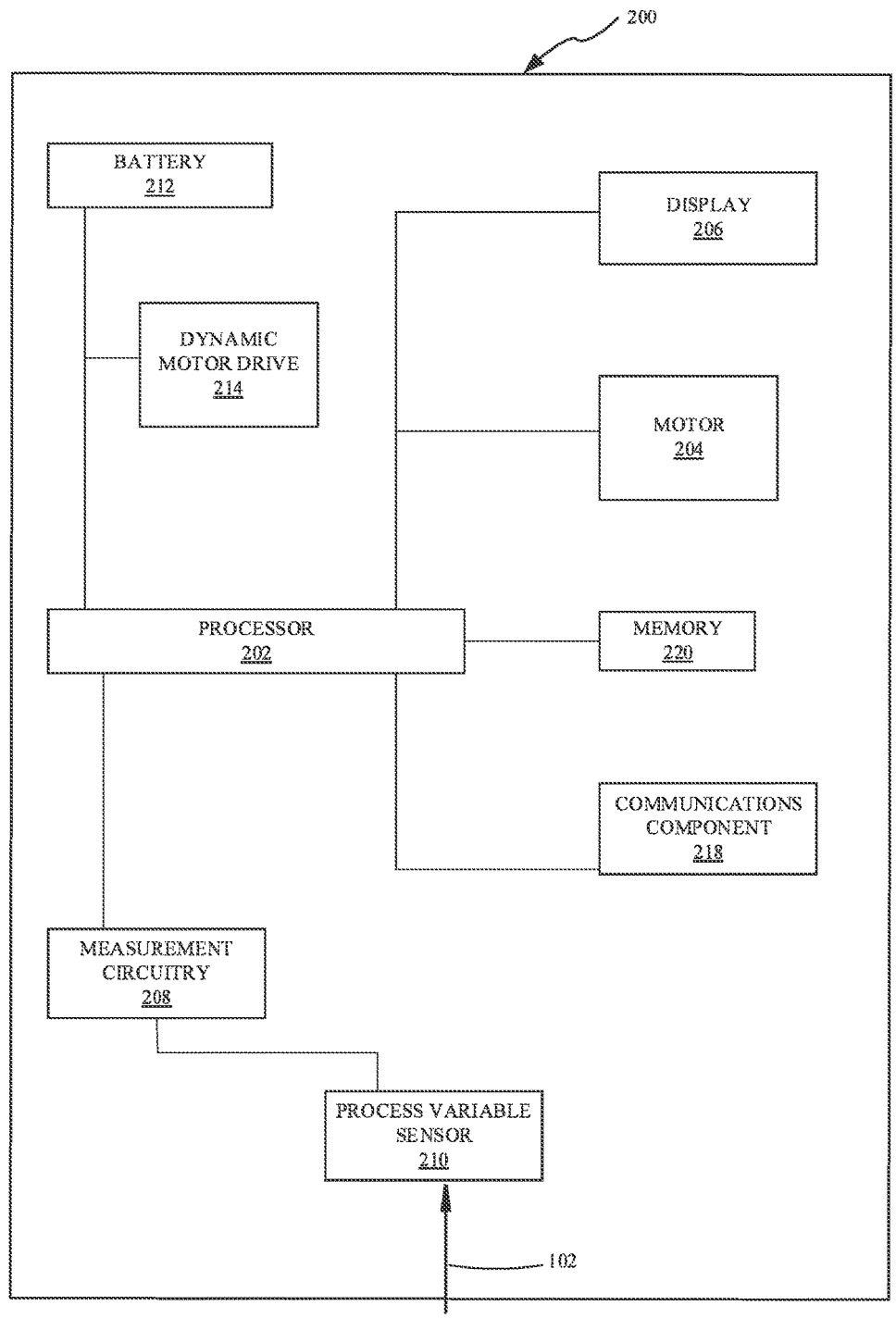
FIG. 2 is a block diagram of a process measurement device with a dynamic motor drive in accordance with one embodiment of the present invention.

FIG. 2 is a block diagram of a process measurement device with a dynamic motor drive in accordance with one embodiment of the present invention. FIG. 2 illustratively shows that process measurement device 200 includes processor 202, display 206, measurement circuitry 208, process variable sensor 210, battery 212, memory 220, communications component 218, motor 204, and dynamic motor drive 214. Process measurement device 200 may be configured to comply with intrinsic safety requirements such that components included in the measurement device and components that are coupled to the device are intrinsically safe. On example of an intrinsic safety requirement is set forth in APPROVAL STANDARD INTRINSICALLY SAFE APPARATUS AND ASSOCIATED APPARATUS FOR USE IN CLASS I, II AND III, DIVISION 1 HAZARDOUS (CLASSIFIED) LOCATIONS, CLASS NUMBER 3610, promulgated by Factory Mutual Research October, 1988. Adaptations to comply with additional industrial standards such as Canadian Standards Association (CSA) and the European CENELEC standards are also contemplated.

Process variable sensor 210 is configured to sense a process variable input from process 102. For example, process variable sensor 210 may be a pressure sensor that senses a pressure of a process fluid, such as a liquid or a gas from the process. Process variable sensor 210 can be other forms of sensors such as temperature, level, flow, etc.

Measurement circuitry 208 may include circuitry that measures an electrical characteristic of the sensor such as capacitance or resistance in order to determine the process variable. Measurement circuitry 208 is configured to provide a digital indication of the electrical characteristic of process variable sensor 210 to processor 202.

Processor 202 is a functional component of measurement device 200 that is activated by and facilitates the functionality of other components within or coupled to the device. Processor 202 may be a microprocessor. In addition, processor 202 may be coupled to or may include memory 220. Memory 220 may be volatile, and/or non-volatile, computer storage media, or any other type of computer memory storage configuration.

The measured process variable, as determined by measurement circuitry 208, is then provided to, for example, processor 202. Processor 202 can provide instructions to various components of device 200 to generate an indication of the measured process variable. One such way is by generating a measurement indication on display 206.

For example, processor 202 interacts with measurement circuitry 208 to provide suitable measurement outputs to display 206. Display 206 may include one or more dials and gauges, along with a measurement indicator (i.e. visual indicator 130 as shown in FIG. 1). The visual indicator rotates around the dial, which includes a series of numbers corresponding to pressure measurements, to point to a determined pressure.

Motor 204 is coupled to display 206 and processor 202, such that processor 202 instructs the motor to move the measurement indicator on display 206 to generate an indication of the measurement output determined by measurement circuitry 208. Thus, indicator 130 is caused to physically move in order to generate an indication of the measured process variable by virtue of processor 202 interacting with motor 204. This is just one example of generating a measurement indication with process measurement device 200. It will be appreciated that a variety of other measurement output configurations may be used.

Motor 204 can be any of a variety of motors that are used in a process measurement device. In one embodiment, motor 204 is a stepper motor. Motor 204 may be a permanent magnet stepper, a hybrid synchronous steppers, a variable reluctance stepper, or any other suitable stepper motor configuration. In an alternative embodiment, motor 204 may be a DC motor. For instance, motor 204 may be a brushless DC electric motor.

A second way of generating a measurement indication for a process variable, as determined by measurement circuitry 208, is by wirelessly communicating the measurement indication. Processor 202 may provide instructions for communicating the measurement indication via communications component 218. Communications component 218 is generally configured to facilitate communication between measurement device 200 and a variety of other devices and applications within and outside of process environment 100. In one embodiment, communications component 218 includes one or more wireless transceivers configured to transmit and receive signals indicative of a process measurement. Communications component 218 may also be configured to transmit and receive signals that are indicative of power consumption levels for process measurement device 200.

For illustrative purposes only, and not by limitation, the WPG (i.e. device 200) is installed and configured to measure fluid pressure of process 102. The device is installed in a process environment and configured to generate pressure measurements for an extended period of time such as, for example, ten years. As mentioned above, measurement device 200 may be configured to generate both a local measurement indication on display 206 and a remote measurement indication that is transmitted by communications component 218 (i.e. a wireless transceiver). As process measurement device 200 ages, battery 212 may become weak or unable to hold a charge and sufficiently power the device. Rather than shut off the entire device, process measurement device 200 may include components that operate to duty cycle power to the display and other components of the device, thereby prolonging the online and active status of the device. In this and similar embodiments, the process measurement device will provide decreased reset occurrences and thus a reduced risk of measurement data being lost.

In order to duty cycle power to process measurement device 200, the device may include dynamic motor drive 214. Dynamic motor drive 214 can include a variety of components that are facilitated by processor 202 to determine power consumption levels and regulate power usage of the device. In one embodiment, dynamic motor drive 214 is a single component that is embedded within microprocessor code (i.e. processor 202). Alternatively, dynamic motor drive 214 may be analog circuitry. Further, dynamic motor drive 214 may include multiple components that are separate digital and/or analog circuit configurations, in one embodiment. Nevertheless, dynamic motor drive is operably coupled to battery 212 and processor 202 to control motor 204.

Figure 3:
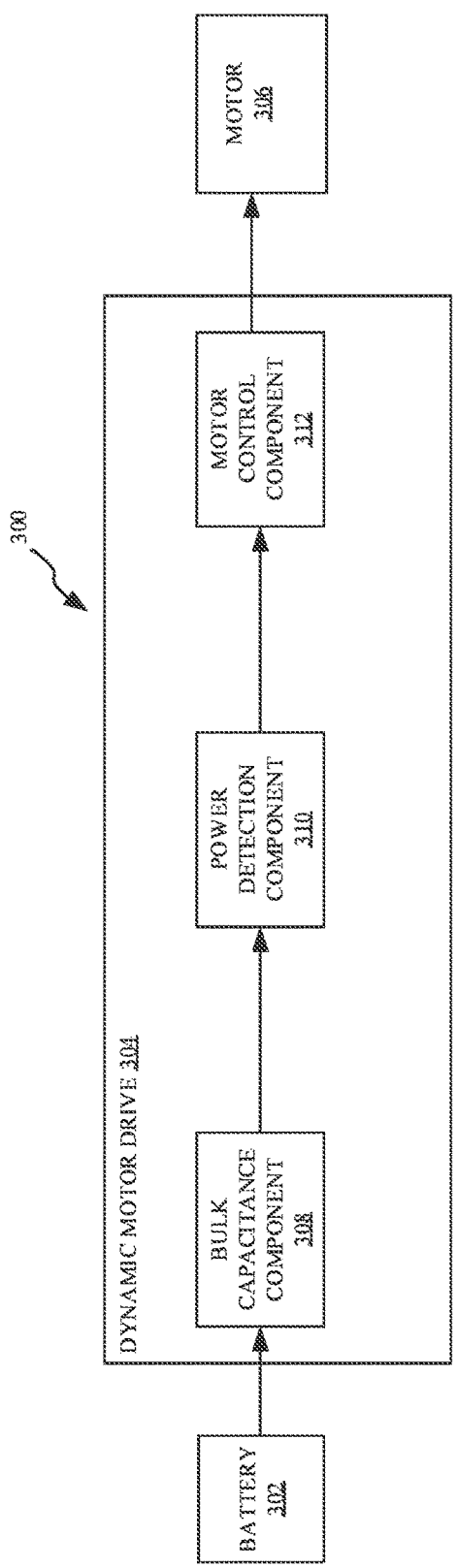
FIG. 3 is a block diagram of a dynamic motor drive in accordance with one embodiment of the present invention

Turning to FIG. 3, the various components of dynamic motor drive 214 will now be discussed in further detail. In one embodiment, process measurement device 300 and dynamic motor drive 304 are the same as or include similar components of process measurement device 200 and dynamic motor drive 214, respectively. Dynamic motor drive 304 is coupled to battery 302 and motor 306 and is configured to control power consumption of device 200. Battery 302 and motor 306 may be the same as or include similar components of battery 212 and motor 204, respectively. Dynamic motor drive 304 illustratively includes bulk capacitance component 308, power detection component 310, and motor control component 312.

It may be advantageous to provide both a visual indication and a wireless transmission of process measurement data. This allows a technician in the field to receive wireless communications and verify those communications with a mechanical measurement output on a faceplate of the device. With this in mind, process measurement device 300 may be configured to generate a visual indication while the device has sufficient power available. When the device determines that there is no longer sufficient power available, the device will reduce power consumption by limiting display output.

Whether motor control component 312 engages motor 306 depends on, for example, a determined amount of power available from battery 302. As such, one or more components of processor 202 are configured to determine an amount of available power from a power source.

Battery 302 provides a power supply source to motor 306 and may be, for example, a replaceable, non-rechargeable battery. Alternatively, battery 302 is a non-replaceable and rechargeable battery. In one embodiment, battery 302 is a battery that is optimized for providing power to a stepper motor. For example, battery 302 can be a lithium thionyl chloride battery.

According to one embodiment, bulk capacitance component 308 is illustratively shown as being coupled to battery 302. In this embodiment, bulk capacitance component 308 includes at least one bulk capacitor that is configured to store a portion of the current provided by battery 302. Bulk capacitance component 308 may also include any number of capacitors that are configured to store a portion of a current provided by a power source.

Dynamic motor drive 304 also includes power detection component 310. Power detection component 310 may be coupled to battery 302 and/or bulk capacitance component 308. For example, power detection component 310 provides an indication of the available power from battery 302 to motor control component 312. In one embodiment, power detection component 308 is a voltage indicator that provides an indication of the current voltage for battery 302. For instance, power detection component 310 is a voltage indicator that includes a low voltage detector circuit.

As such, motor control component 312 is configured to receive an indication of the available battery voltage from power detection component 310. In one embodiment, motor control component 312 engages the motor by virtue of instructions provided by one or more components of dynamic motor drive 304 (i.e. power detection component 310). Motor control component 312 may include a motor controller and motor control circuitry. While the motor controller provides dynamic drive instructions, the motor control circuitry is configured to receive those instructions and implement them on motor 306. For example, the motor control circuitry implements the commands prescribed by the motor controller to generate bulk movement, generate one or more smaller movements (i.e. block movements), or stall the motor. Generating movement may include converting bulk motor movement into a series of smaller block movements. Thus, one or more components of processor 202 provide instructions to motor control component 312 to engage motor 306 and generate a measurement output for process flow 102.

Determining available power can provide several advantages to process measurement device 300. For one, the determined amount of available power can be used to throttle the power consumption of motor 306. Motor control component 312 may reduce or increase the frequency and duration that motor 306 is engaged based on the assessment of available power. In one embodiment, when motor control component 312 determines a decrease in available power, dynamic motor drive 304 facilitates the conversion of bulk motor movements to smaller motor movements to increase power consumption efficiency. Increasing power consumption efficiency reduces the variability in available power from battery 302, and thus reduces the risk of battery 302 losing its charge. Determining the amount of available power may also be valuable in continuously operating process measurement device 300 at optimal power levels. In one embodiment, motor control component 312 assesses a voltage level of the battery before causing any subsequent block movements of the motor. This configuration may allow motor 306 to operate at optimal speeds while providing continuous measurement indications.

Motor control component 312 uses the voltage indication from power detection component 310 to determine when the device has sufficient power to generate continuous movement of motor 306. The motor control component 312 performs, for example, processing that determines whether to engage the dynamic drive, thereby duty cycling motor 306. When power detection component 310 provides an indication that there is insufficient voltage to run motor 306 at its optimal speed motor control component 312 will move the motor dynamically.

Rather than instructing continuous and standard motor movement, which requires a high power cost at start-up, motor control component 312 will instruct motor 306 to be moved a finite amount called a "block." Once motor control component 312 moves motor 306 a single block, power detection component 310 will assess the voltage level of battery 302 and provide a voltage indication to further assess any subsequent motor movement.

When power detection component 310 indicates that there is still insufficient voltage for the initial generation of continuous motor movement (i.e. start-up cost), but there is sufficient voltage for at least some motor movement (i.e. a block movement), motor control component 312 engages motor 306 to move another block. Dynamic motor drive 304 will repeat this cycle of assessment and block movements until motor 306 has rotated to the desired position (i.e. the position that the measurement indicator points to the measurement on the dial).

In one embodiment, bulk capacitance component 708 is configured to receive and store a small current provided from battery 302. For instance, when power detection component 310 indicates that power is too low for continuous motor 706 movement, bulk capacitance component 708 can be trickle-charged with the weak battery. In other words, bulk capacitance component 708 receives a small current until it has enough energy available to perform a block movement.

If power detection component 310 indicates that there is an abundance of voltage available at battery 302, dynamic motor drive 304 will not cycle block movements but will rather engage motor 306 to operate as a standard drive motor. Motor control component 312 will thus generate continuous motor movement so motor 306 operates at its optimal speed.

If, however, dynamic motor drive 304 determines that there is insufficient power to engage any motor movement, motor 306 may be turned off. For example, motor control component 312 receives an indication from power detection component 310 that the available voltage is insufficient to move motor 306. In response, motor control component 312 may restrict power to motor 306 using the power control circuit and wait for the voltage to return to a sufficient level. While power to motor 306 is restricted, other components of process measurement device 300 remain functional. For instance, communications component 218 may be able to function on the available voltage, thereby providing a mechanism to communicate and store process information. Once motor control component 312 receives an indication from power detection component 310 that the voltage has returned to a sufficient level, motor control component 312 may instruct motor 306 to move another block and so forth. As such, motor control component 312 duty cycles the motor power and/or speed to reduce the average amount of current that is consumed. The result of this will be a motor that moves as it can for the given amount of available power while reducing the risk of losing valuable process measurement and environment information via a device reset.

Figure 4A:
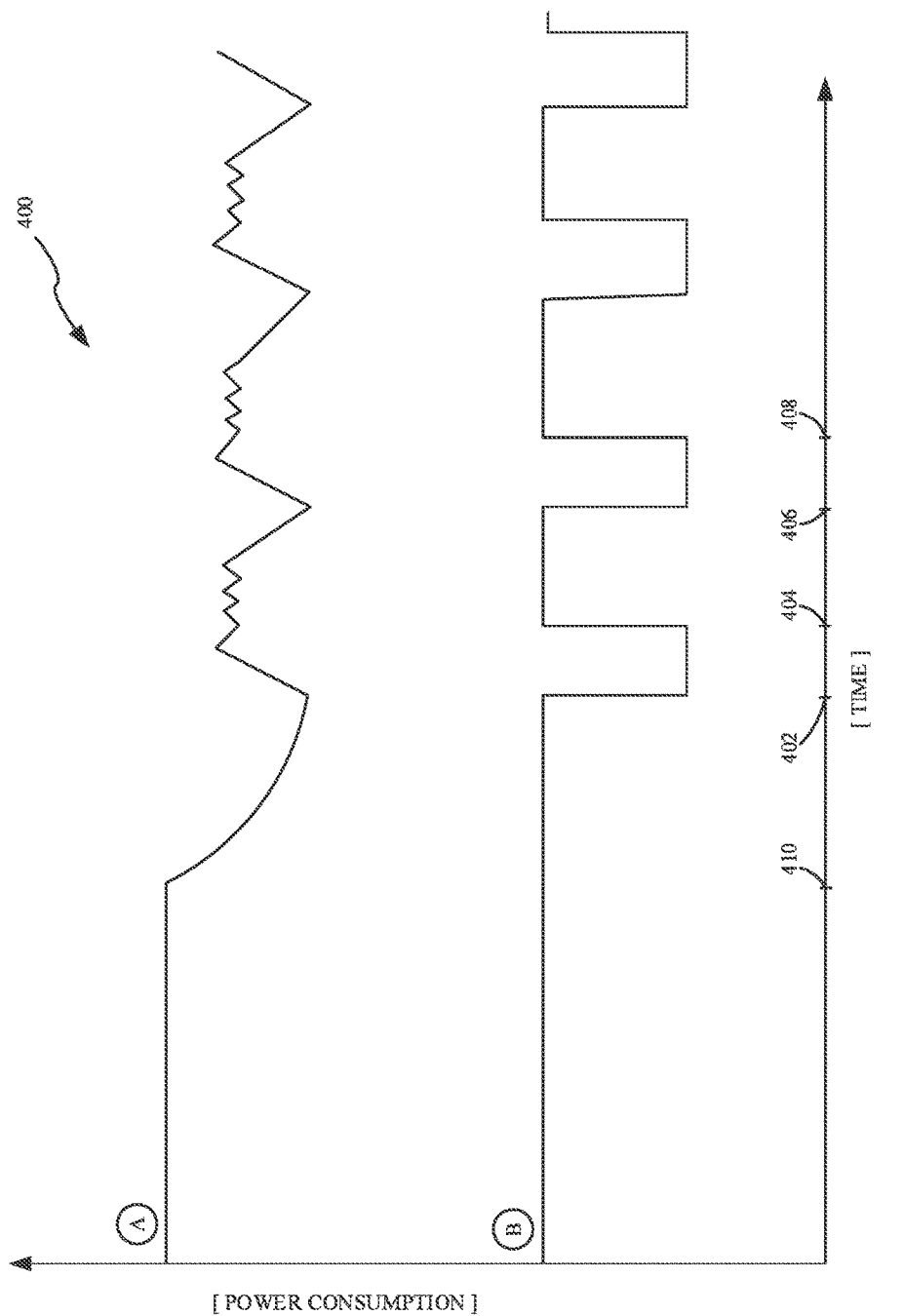
FIG. 4A is a diagrammatic view of a device operating on low battery power without a dynamic motor drive.

As discussed above, a process measurement device equipped with a dynamic motor drive can provide several advantages over standard and fixed motor drive units. One particular advantage is the decreased risk of the measurement device resetting. FIGS. 4A and 4B illustratively show this advantage in practice.

FIG. 4A is a diagrammatic view of a device operating on low battery power without a dynamic motor drive. FIG. 4A includes a graphical representation 400 of power consumption as a function of time. Reference letter A indicates power consumption of the measurement device while reference letter B indicates a device reset signal. The power consumption of the measurement device illustratively shows the amount of power (i.e. the voltage) that is utilized by a motor without a dynamic drive system. The device reset signal illustratively shows the available voltage for the device. As such, when reference line B shows a decrease in voltage this is indicative of a power supply being restricted to the motor, and thus a device reset. FIG. 4A will now be discussed in more detail.

Graphical representation 400 illustratively shows that a drop in available voltage occurs when the motor is initially activated. This is because the amount of startup power required to initiate the standard motor drive is high. Startup cost results in a drop in available voltage that is generally indicated at an initial time 410. High load currents, such as measurement device motor movement, cause this drop in voltage. If the voltage drop is not closely monitored, additional voltage may be lost and ultimately cause a device reset. When the device resets, the device reset signal also indicates a drop in available voltage. The drop in voltage, and thus the reset period, are generally indicated between time 402 and 404. During the time between 402 and 404 the measurement device drops off the communications network and any measurement data that would have been obtained during that period is lost. When the device recovers and motor current demand begins again, the high current motor movement causes another device reset between time 406 and 408. It is illustratively shown that the device never recovers from the cycle of resetting due to the high current load demand. As the power level required for generating motor movement increases, the device loses an accumulation of data due to a series device resets. This leads to device performance and data accumulation unpredictability. Such unpredictability can be potentially detrimental in some process environments.

FIG. 4B is a diagrammatic view of a device operating on low battery power with a dynamic motor drive in accordance with an embodiment of the present invention. FIG. 4B illustratively includes graphical representation 450 that shows the power consumption of a process measurement device with a dynamic motor drive. Device power consumption is represented by line E while a device reset signal is represented by line F. In addition, a battery control signal is represented by line G. The battery control signal may provide an indication of whether the battery is in a condition that warrants a shutdown operation. For instance, the control signal monitors the available voltage and provides an indication of whether that amount of voltage should result in the motor being shut off (i.e. restricted from receiving power from a power source). Power consumption is generally shown as a function of time. In a device with a dynamic motor drive (i.e. process measurement device 200 with dynamic motor drive 214), the motor is activated and causes a drop in voltage due to a weakening battery. Motor activation and the ensuing voltage drop are generally shown at 420. However, rather than a large decrease in voltage upon start-up, the dynamic motor drive 214 allows for a more consistent power use. While standard drives have been shown to greatly fluctuate between sufficient power and little to no voltage being available (when the device resets), the dynamic drive system maintains adequate voltage to power the motor. It is shown that both the power consumption (E)

and available voltage (F) are much more consistent that the standard drive system depicted in FIG. 4A. Maintaining adequate voltage is generally shown between time 422 and 424. As such, dynamic motor drive 214 provides a more predictable and reliable motor control system, which further provides increased accuracy and retention of process variable information.

To overcome the challenge of maintaining a sufficient power supply, the dynamic drive system is configured to monitor power supply levels. When the dynamic drive system determines a low voltage condition, it shuts down or reduces power use of the motor until adequate power is restored. At time 426, it is illustratively shown that the dynamic motor drive maintains a sufficient voltage for operation and avoids a system reset and loss of measurement data.

FIG. 5 is a diagrammatic view of a method of dynamically controlling a battery powered motor. In order to dynamically control a battery powered motor, a dynamic motor drive monitors power availability (i.e. dynamic motor drive 214). Monitoring power availability is generally indicated by block 502. A power detection component that includes, for example, a low voltage detection circuit is coupled to a battery and configured to generate an indication of power consumption. For example, power detection component 310 provides an indication of a voltage level for a battery source. Once the amount of available power is indicated, motor control component 312 may determine whether the power availability is sufficient to engage the motor. Determining whether the power availability is sufficient is generally shown at block 504. A sufficient power source may be one that provides a voltage level above a specified parameter or range. For example, an operator provides a minimum threshold for the amount of available power that is required to operate the motor at full standard speed without resetting the measurement device. In one embodiment, the operator provides thresholds or power availability ranges via system controller 108.

When the dynamic drive system determines that there is power available at an amount greater than the minimum threshold, the motor operates at an optimal speed. This is generally indicated at block 520. For instance, when dynamic motor drive 214 determines that there is sufficient power, the motor control component engages the motor as fast as it can for the given amount of power that it has. The dynamic drive system will continue to monitor power consumption, which is generally shown by reverting to block 502.

When there is insufficient power the dynamic drive system may determine that the current amount of available power is less than a pre-defined minimum threshold. The dynamic drive system will detect a decrease in available power. This is generally indicated by block 506. When the battery becomes weak, for example, it is slower to respond to the motor's current demand and thus decreases its power consumption and voltage availability. The dynamic motor drive may respond to a decrease in available power by controlling the motor to reduce the motor speed. Reducing the motor speed is generally shown at block 508.

A user may, for example, define the reduced speed of the motor that occurs in response to determining a decrease in the amount of available power. In one embodiment, reducing the motor speed includes converting bulk motor movements to smaller block movements that demand less power. Upon reducing the motor speed at block 508, the device may continue to monitor power consumption and reverts to block 502. As such, FIG. 5 generally illustrates an overview of a method of dynamically controlling a battery powered motor and, more specifically, but not by limitation, dynamically controlling a power supply for a measurement device in a process environment.

FIG. 6 is a diagrammatic view of a method of dynamically controlling a battery powered motor based on voltage indications. At block 602, a dynamic motor drive is configured to receive a voltage indication. In one embodiment, a voltage indication is provided by a power detection component that is coupled to a battery for a process measuring device. Based on the voltage indication provided by the power detection component, the device is configured to determine whether there is a sufficient amount of voltage available at a power source. Determining whether there is sufficient voltage is generally shown at block 604. For example, motor control component 312 receives a voltage indication from power detection component 310. The indication generally shows that the available power is less than a specified minimum threshold, where the minimum threshold is indicative of a voltage amount or range that results in resetting of the measuring device. Thus, the device may determine that there is not sufficient voltage to power the motor and, in response, reduces power consumption. Reducing power consumption is shown at block 620. Motor control component 312 may completely or partially restrict the power being supplied to motor 306. Dynamic motor drive 214 may revert to receiving further voltage indications once the drive reduces power consumption and prevents the device from resetting. As such, block 620 illustratively reverts to block 602 to receive an additional voltage indication.

Alternatively, the dynamic motor drive may determine that there is sufficient voltage available from the power supply. In one embodiment, sufficient voltage includes a voltage amount above a minimum threshold for engaging motor 306. For instance, a minimum threshold includes the minimum amount of voltage required to instruct and execute a single block movement of the motor. A minimum threshold of voltage may also include the minimum amount of voltage required to run data collection or communications processes that keep the device online, for example.

In response to determining that the amount of available voltage is above the minimum threshold, the dynamic motor drive instructs a block movement of the motor. For example, the dynamic drive system includes a stepper motor that utilizes digital pulses converted to mechanical shaft rotations to move a motor in one or more series of block movements. As such, if there is at least a minimum voltage available from a battery, motor control component 312 engages stepper motor 306 in the increment of a single block. At block 608, the dynamic drive system is configured to determine whether the motor is at a desired position. When the motor is at a desired position the process may end as the motor control has executed instructions to move motor 306 to generate, for example, a measurement indication on a faceplate. However, when the motor is to not at the desired position, one or more additional block movements may be required. The dynamic motor drive may then revert to block 604 and perform further evaluations to determine if there is sufficient voltage for bulk or block motor movements.

Alternatively, when power detection component 310 determines that there is sufficient voltage at block 604, dynamic motor drive 214 instructs the motor to move as fast as possible for the given amount of power that it has. Thus, reducing power consumption at block 620 can include optimizing the amount of power consumption such that the motor moves in block movements to continuously evaluate the available power and reduce the risk of resetting the device.

Figure 7:
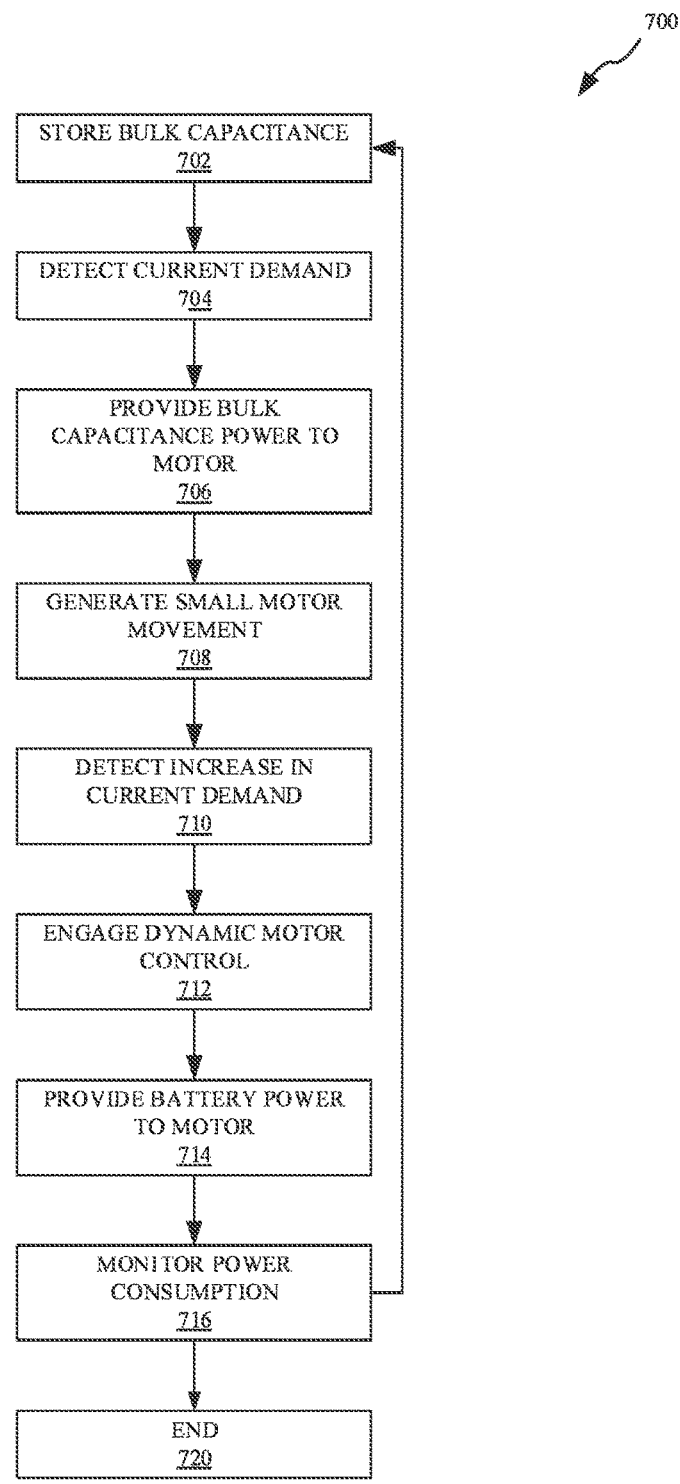
FIG. 7 is a diagrammatic view of a method of dynamically controlling a battery powered motor with stored capacitance.

FIG. 7 is a diagrammatic view of a method of dynamically controlling a battery powered motor with a stored capacitance. When a dynamic drive system is engaged and a motor is supplied a given amount of power from a power source, the battery produces a current as a voltage. In one embodiment, the dynamic motor drive includes a component that is configured to store at least a portion of capacitance produced by the battery. The battery referred to herein includes both internal and external power sources to the dynamic drive system.

Turning briefly to FIG. 3, dynamic motor drive 314 illustratively includes bulk capacitance component 308. Bulk capacitance component 308 is configured to store capacitance for use in generating motor movements. Such a configuration can be advantageous when power consumption needs to be reduced, but motor movement is beneficial.

As such, method 700 illustratively shows a method of storing energy in a bulk capacitance component in accordance with the operation of a dynamic motor drive generating motor movement for a process measurement device. Storing energy in a bulk capacitance component is generally shown at block 702. At block 704, the dynamic motor drive is configured to detect a current demand. For example, one or more components of dynamic motor drive 214 detect an increase in current demand and thus an increase in demand from a power source (i.e. battery 212).

Power detection component 216 may determine that there is an increase in power demand and enlist the help of bulk capacitance component 308. By adding energy from a bulk capacitance component, the initial current for the motor will be mostly supplied by the power stored in the one or more capacitors at bulk capacitance component 308. As such, when a current demand for generating motor movement is detected, the system is configured to provide bulk capacitance power to the motor. Providing bulk capacitance to the motor is generally indicated at block 706.

In one embodiment, the stored energy provides a lesser degree of power compared to battery 212. As such, energy stored at bulk capacitance component 308 is generally utilized by dynamic motor drive 214 to generate small motor movements. Generating small motor movements is generally shown at block 708. For example, motor control component 312 uses the stored capacitance to move motor 306 one or more small blocks. This allows for smaller movements of the motor at a fast rate even if the power source is weak. Once the movement is large enough, the power source will need to supply the bulk of the current and the motor control component will begin to instruct standard motor movements, if needed. As such, the dynamic motor drive is configured to detect an increase in current demand and engage the dynamic motor control. These are generally indicated at blocks 710 and 712, respectively.

With the dynamic motor control engaged, the device switches power consumption from the stored bulk capacitance to the primary power source, such as battery 212. Thus, battery power is provided to the motor, as shown at block 714. The dynamic motor drive continues to monitor power consumption and levels of stored bulk capacitance as small motor movements and large motor movements are generated. The system is constantly monitoring power and storing at least a portion of the power source for immediate use when motor demand is high but risk for a device reset is also high.

With the dynamic drive system and the dynamic motor controller, a power limited device can adjust its power consumption to match the power that is available. This keeps the device functional for a much longer time by preserving and extending the overall battery life.

Although the present invention has been described with reference to preferred embodiments, workers skilled in the art will recognize that changes may be made in form and detail without departing from the spirit and scope of the invention.

What is claimed is:

1. A process variable measurement device comprising:
    a visual indicator configured to indicate a process variable measurement output;
    a battery;
    a motor controller coupled to the battery;
    a motor operably coupled to the visual indicator and electrically coupled to the motor controller, and
    wherein the motor controller is configured to detect an amount of available power from the battery and engage the motor based on the amount of available power.

2. The process variable measurement device of claim 1, wherein the motor controller is configured to convert bulk motor movement into a series of block movements and cause at least one block of movement in the motor and then assess a voltage of the battery before causing a subsequent block of movement.

3. The process variable measurement device of claim 1, further comprising a power detection component coupled to the battery, wherein the power detection component is configured to provide an indication of the voltage of the battery to the motor controller.

4. The process variable measurement device of claim 3, wherein the power detection component comprises a low voltage detector circuit.

5. The process variable measurement device of claim 1, wherein the motor is a stepper motor.

6. The process variable measurement device of claim 1, and further comprising a bulk capacitance component operably coupled to the battery, wherein the bulk capacitance component is configured to store a portion of available power from the battery.

7. The process variable measurement device of claim 4, wherein the bulk capacitance component comprises at least one bulk capacitor operably coupled to the battery to assist driving the motor.

8. The process variable measurement device of claim 3, wherein the motor controller is configured to compare the indication of the voltage of the battery to a minimum voltage threshold to determine whether there is sufficient power available to engage the motor.

9. The process variable measurement device of claim 8, wherein the motor controller determines that there is insufficient power available to engage the motor and, in response, is configured to generate at least one block movement.

10. The battery-powered device of claim 1, wherein the motor controller is configured to engage the motor based on the amount of available power such that the motor controller prevents the process variable measurement from resetting.

11. The process variable measurement device of claim 1 and further comprising a wireless transceiver configured to transmit signals in a process environment.

12. A method of dynamically controlling a motor for a measuring device, comprising:
    detecting an amount of available power from a battery by using a power detection component;

analyzing the amount of available power to determine whether there is a sufficient amount of power to engage a motor;

coupling a bulk capacitance component to the motor controller wherein the bulk capacitance component is configured to store energy received from the battery;

wherein the motor controller is configured to use the stored energy in the bulk capacitance component to move the motor a finite amount;

assessing the position of the motor to determine whether the motor is at a desired position; and determining that the motor is not at the desired position and, in response, generating instructions with the motor controller, wherein the instructions instruct a motor control component to move the motor a subsequent finite amount to indicate a process variable.

13. The method of claim 12, wherein analyzing the amount of available power comprises analyzing with a motor controller.

* * * * *

UNITED STATES PATENT AND TRADEMARK OFFICE
CERTIFICATE OF CORRECTION

PATENT NO. : 10,305,403 B2
APPLICATION NO. : 15/198054
DATED : May 28, 2019
INVENTOR(S) : Eric Russell Lovegren and Richard Louis Nelson It is certified that error appears in the above-identified patent and that said Letters Patent is hereby corrected as shown below:

In the Specification

Column 7, Line 23-29: "708" should be "308"

Column 7, Line 27: "706" should be "306"

Signed and Sealed this
Seventeenth Day of March, 2020

Andrei Iancu
*Director of the United States Patent and Trademark Office*